April 28, 1959 H. C. SAUER 2,883,701
APPARATUS FOR MOLDING V-BELTS
Filed May 19, 1955
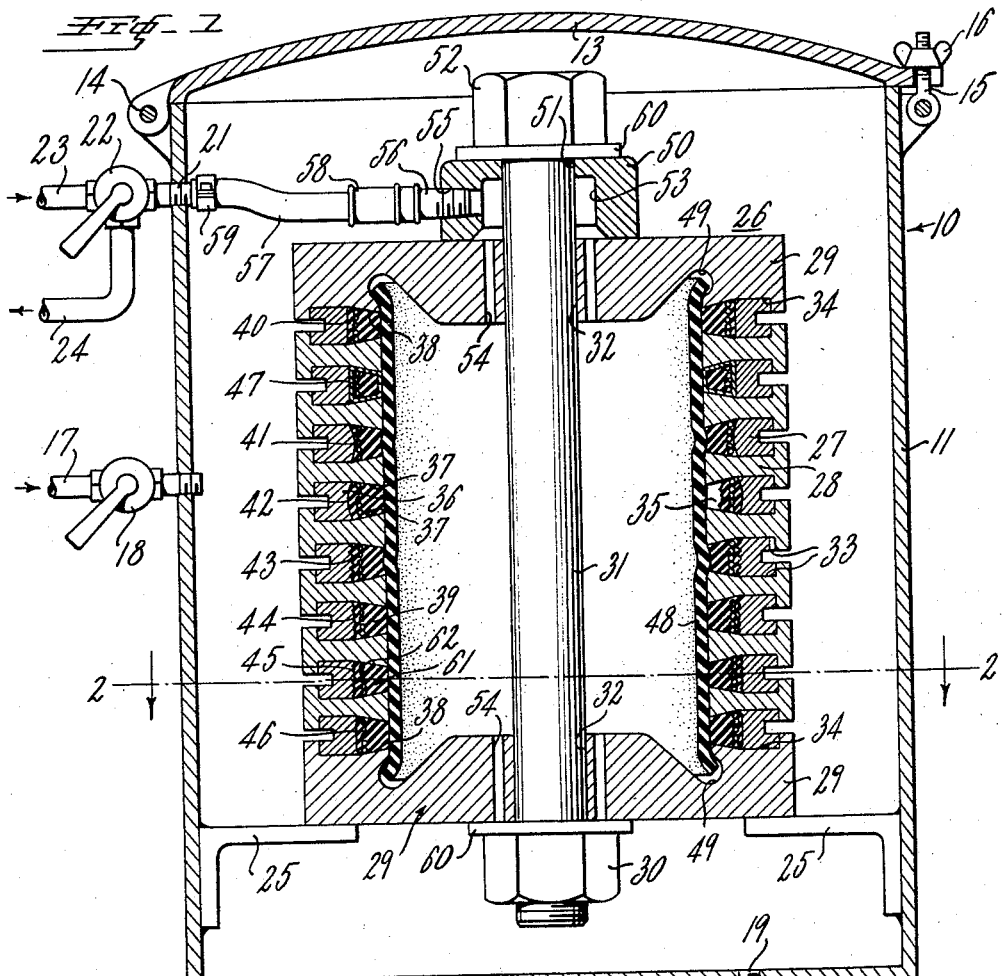
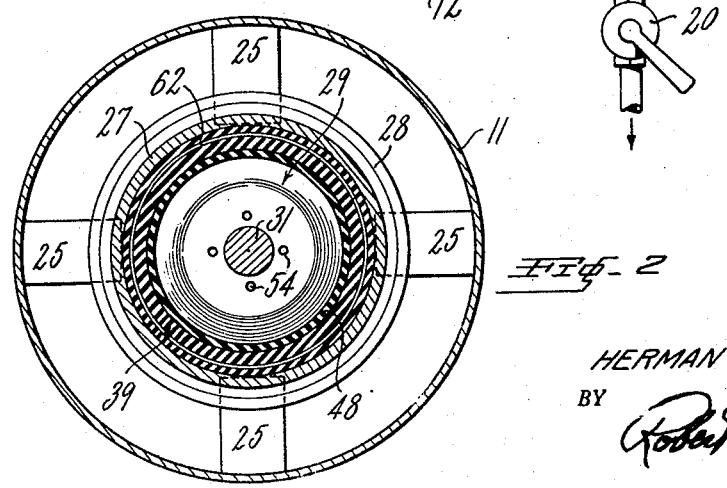
INVENTOR.
HERMAN C. SAUER
BY
ATTORNEY

United States Patent Office 2,883,701
Patented Apr. 28, 1959

2,883,701

APPARATUS FOR MOLDING V-BELTS

Herman C. Sauer, Ambler, Pa., assignor to United States Rubber Company, New York, N.Y., a corporation of New Jersey Application May 19, 1955, Serial No. 509,485

6 Claims. (Cl. 18—6)

This invention relates to the manufacture of endless belts and more particularly to the molding of V-belts under outwardly directed uniform radial pressure applied to their entire inner peripheries.

In conventional practice, it is customary to make the volume of the uncured V-belts slightly greater than the volume of the typical mold cavities in order to obtain a fully molded product. The unfortunate result is that a substantial amount of belt material is wasted as flash, which must be trimmed off. It is likewise customary to employ conventional ring-type molds having cavities which completely enclose the belts or which expose their tops or outer peripheries to inwardly directed radial pressure. One disadvantage is that any volume irregularities are reflected in the thickness and the contour of the top and side surfaces of the belts. These irregularities prevent the belts from seating properly in their pulleys, causing undesirable vibrations, rapid, uneven wear, and slippage relative to the pulleys. Another disadvantage is that the molded belts do not have a perfectly flat and smooth or otherwise symmetrical top surface which prevents them from being adapted to drives wherein a pulley or idler is driven by the top of the belt or where vibrationless motion is required. A further disadvantage, and very important, is that during the molding process, the cords or tension members of the belts are sometimes forced out of alignment. As a consequence, when the belt is stretched over pulleys in operation, the applied tensile stress will be unevenly distributed over the tension members, resulting in premature belt failure.

Therefore, one object of this invention is to provide an improved apparatus for producing a belt which is fully molded on at least the three most essential surfaces without waste, by utilizing an uncured belt volume which is equal to or slightly less than the mold cavity volume.

Another object is to provide an improved apparatus wherein the entire inner peripheries of the belts are exposed to outwardly directed uniform radial pressure to produce belts of uniform width and density, to restrict any volume irregularities to the inner peripheries of the belts and to prevent misalignment of the belt cords or tension members.

Another object of the invention is to provide an improved apparatus for producing a belt having a symmetrical top surface which may be flat, convex, concave, smooth, knurled, grooved, rippled or any other desired configuration.

Still another object of the invention is to provide an improved apparatus for producing a belt which has an undistorted cord line for high tensile strength, low belt stretch and the least possible belt vibration.

Other objects and advantages of the invention will become apparent upon consideration of the following specification and claims when read in conjunction with the accompanying drawing, wherein:

Fig. 1 is a vertical sectional view of apparatus constructed in accordance with the invention, showing an autoclave enclosing the mold, and numerous types of belts located within the mold; and Fig. 2 is a horizontal sectional view taken on line 2—2 of Fig. 1, but on a slightly reduced scale.

Referring to the drawing, the apparatus employed in the practice of the invention will be described first. As shown in Figs. 1 and 2, the numeral 10 designates a substantially cylindrical autoclave having a peripheral wall 11 and a bottom wall 12. At the top the autoclave 10 is closed by a cover 13 which is hinged at 14 and locked in place by a pivoted eye bolt 15 and wing nut 16. The peripheral wall 11 is provided with a steam inlet pipe 17 controlled by a valve 18, and a steam outlet pipe 19, which is opened or closed by a valve 20, extends through bottom wall 12. As will be apparent, pipes 17 and 19 may be respectively connected to a suitable source of steam supply and a drain (neither of which are shown). The peripheral wall 11 is also provided with a fluid inlet and outlet pipe 21 having a control valve 22. As will be evident from the arrows in Fig. 1, the incoming fluid flows through pipe 21 from inlet pipe 23 while the outgoing fluid flows from pipe 21 to outlet pipe 24. Pipes 23 and 24 may likewise be connected to another suitable fluid source and drain (not shown).

Near bottom wall 12 a plurality of spaced circumferential flanges 25 are secured to the inside of the peripheral wall 11 for supporting a substantially cylindrical mold 26. The mold 26 comprises a plurality of mating mold rings 27 and 28 which are closed at each end by circular plates 29, and clamped in stacked relation by a nut 30 and a bolt 31 which extends through bores 32 in plates 29. As will be apparent, the end plates 29 and rings 27, 28 are interchangeable to facilitate assembly and disassembly of mold 26. Rings 28 have annular recesses 33 for locating the rings 27 while the plates 29 have like recesses 34 for positioning rings 27. Each of plates 29 and rings 27, 28 have mating surfaces which cooperate to form the annular belt-receiving cavities 35 within and between the rings and plates. In the particular embodiment illustrated, the inner peripheries 36 of the rings 27 form the outer peripheral walls of the cavities 35 for receiving the outer peripheries of the belts 39, while the converging side walls of the cavities are formed by surfaces 37 on rings 28 and surfaces 38 on plates 29 for receiving the sides of the belts 39. The surfaces 37 and 38 extend to the inner peripheries of rings 28 and thus form peripheral openings therebetween to expose the entire inner peripheries of the belts 39, which are adapted to be inserted in the cavities 35.

If desired, the rings 27 could be incorporated as an integral projection on rings 28 in order to reduce the number of mold rings. However, separate rings 27 and 28 are preferred for itnerchangeability and for ease in machining the inner peripheries 36 of rings 27 to the desired shape and surface. This is particularly advantageous when a variety of types of belts 39 are to be molded, even in one mold. As clearly shown in Fig. 1, the inner peripheries 36 of rings 27 may be smooth and straight to form a belt with a cylindrical outer periphery as at 40; they may be curved to form a belt with a concave outer periphery as at 41 or a convex top surface as at 42; they may be machined to produce belt peripheries which are rippled as at 43, grooved as at 44, knurled as at 45, and beveled as at 46. Moreover, the inner peripheries 36 of rings 27 may be constructed to produce any combination of the above noted shapes and surfaces. In addition, the belts 35 may be provided with a jacket as at 47.

Within mold 26 is disposed a substantially cylindrical, flexible member 48 which is preferably an open ended sleeve. As illustrated in Fig. 1, the ends of sleeve 48 extend into opposed annular recesses 49 in plates 29, and as will be explained more fully below, the walls of recesses 49 seal the ends of sleeve 48 by firm engagement therewith. Sleeve 48 may be made of any suitable elastomeric material, but preferably of a heat resistant rubber, compounded and vulcanized in known manner. "Butyl" rubber (a rubbery copolymer of 90 to 99.5% of isobutylene and 10 to 0.5% of an aliphatic conjugated $C_4$ to $C_6$ diolefin hydrocarbon, especially butadiene or isoprene) compounded and vulcanized in the manner shown in U.S. Patent 2,701,895 to Tawney et al., is especially preferred because of its high resistance to deterioration upon prolonged and frequent heating at high temperatures. Likewise, sleeve 48 is preferred to the use of an inflatable curing bag having closed ends because the former is less cumbersome, can be removed from and inserted in a mold much more easily and quickly, and it can be turned inside out to prevent it from taking a "set" or permanent deformation, thereby prolonging its service life. Thus, compared to a bag, sleeve 48 is much more economical and is also easier to handle.

In order to provide a simple, compact, convenient, and yet very effective means for expanding sleeve 48 so that it closes the entire inner peripheral openings of the belt cavities 35 and contacts the entire inner peripheries of the belts 39, mold 26 is provided with a hollow, cup-shaped adapter 50 at one end for admitting fluid under pressure. As shown in Fig. 1, the adapter 50 is provided with a bore 51 for sliding over bolt 31 and is held in firm, fluid-tight engagement with upper plate 29 by head 52 of bolt 31. Adapter 50 is also provided with an enlarged, chamfered recess 53 which communicates with spaced bores 54 in upper plate 29. (Lower plate 29 also has identical bores so that the two may be readily used interchangeably.) A tapered bore 55 extends radially through the peripheral wall of adapter 50 and may be threaded for a nozzle 56 which is connected to one end of a short length of hose 57 by a conventional snap-on coupling 58 for quick connection and removal of hose 57. The other end of hose 57 may be connected to pipe 21 by any suitable means such as a typical hose clamp 59. In order to prevent any possible leakage of fluid through bores 54 and between lower plate 29 and nut 30, or between adapter 50 and bolt head 52, conventional washers 60 may be employed.

While autoclave 10 has been described and illustrated in a specific form, it is to be understood that various changes could be made therein without departing from the scope of the invention. For example, the pipe 21 could enter through the lid 13 instead of peripheral wall 11; the autoclave 10 is merely representative of standard design and could easily be adapted to accommodate a number of molds, each having a separate intake hose; the position of mold 26 need not be vertical nor are flanges 25 absolutely necessary, but are merely shown for convenience, and as will be brought out more clearly below, the autoclave 10 could be eliminated entirely, if so desired.

The method employed in the practice of the invention will now be described. The belts 39 are basically composed of a rubber or rubber-like body portion 61 having a substantially trapezoidal shape and the usual circumferential reinforcing cords or tension members 62 embedded therein adjacent the wide outer periphery thereof. The belts 39 are built up around a cylindrical form (not shown) and cut to shape in a manner well-known to those skilled in the art. However, instead of cutting the belts 39 slightly oversize so that the uncured volume of each is slightly greater than that of the mold cavity 35, as in conventional practice, they are cut to approximately the desired size so that the volume of each is equal to or slightly less than the mold cavity volume. As will be apparent, this will prevent formation of flash during molding or eliminate flash removal, and will result in considerable savings in belt material, along with other advantages to be described below.

Once the belts 39 are cut they may be provided with a fabric jacket 47 as noted above. At this point the mold rings 27 and 28 are stacked on lower plate 29 and the belts 39 interposed therebetween in the cavities 35, the outer peripheries and sides of the belts 39 lying adjacent the outer peripheral cavity walls formed by the inner peripheries 36 of the rings 27 and the cavity side walls formed by surfaces 37 on rings 28 and surfaces 38 on plates 29, respectively. The sleeve 48 is inserted within the stacked rings and upper plate 29 is positioned over the uppermost ring 27 and belt 39. Then the adapter 50 is slid over bolt 31 which is passed through bores 32 in plates 29 and the assembly is then clamped by tightening nut 30. Mold 26 is now placed in autoclave 10, the hose 57 being connected to nozzle 56 in adapter 50 by snap-on coupling 58, and lid 13 is closed and latched.

Valve 22 is operated to open inlet pipe 23 and to admit fluid into sleeve 48 while valve 18 remains closed. The fluid entering sleeve 48 may be either water, steam, gas or air under pressure. As sleeve 48 is expanded, any air which might possibly be trapped in the mold cavities 35 is forced out of the mold 26 through the joints between the mold rings 27, 28 and plates 29. This is especially advantageous in avoiding the formation of pockets or blisters in the belts 39, which would substantially reduce their strength as well as mar their appearance. As the maximum pressure is reached a tight seal is made within mold 26 by the radial expansion of sleeve 48, thereby forcing the belts 39 completely into the cavities 35 and effectively sealing them therein to prevent contact with the fluid, and thus avoid the formation of the blisters and pockets noted above. Likewise, the ends of sleeve 48 which extend into recesses 49 in plates 29, will be forced outwardly by the fluid pressure into firm engagement with the outer walls of the recesses. Thus the open ends of sleeve 48 are effectively sealed against plates 29 to prevent leakage of the fluid between belts 39 and surfaces 38 as well as between rings 27 and recesses 34. As shown in Fig. 1, there are slight volumetric variations between the individual belts 39, but the sleeve 48 automatically compensates for this by following each belt 35 into its cavity whatever amount is necessary. As a result, all volume irregularities will be restricted to the inner peripheries of the belts, while the thickness and contour of the side surfaces and outer peripheries of the belts 35 will be uniform.

Since the pressure within sleeve 48 is uniform throughout, the outwardly directed radial pressure applied to each belt 39 by sleeve 48 will likewise be uniform. The intimate contact between the outer peripheral wall of sleeve 48 and the entire inner periphery of each belt 39 ensures that the pressure will be distributed uniformly too. These features help to produce belts of uniform width and density, and place the desired uniform tension on the reinforcing cords 62. Moreover, the application of pressure directly to the inner peripheries of belts 39 rather than to their outer peripheries as in the prior art, prevents any misalignment between the individual cords 62 or any buckling or slag of the cord line, as well as undesirable deformation of the side and top surfaces of belts 39, because only the inner periphery of the softer body portion 61 will be directly subject to deformation by sleeve 48. Advantages of straight cord lines in belts 39 are high tensile strength, low belt stretch and the least possible vibration, each making for an increased operating life. An advantage of undeformed side surfaces is proper seating of belts 39 in their pulleys for eliminating undesirable vibration, wear and slippage, while a uniformly shaped top surface which is smooth and flat or otherwise symmetrical, makes belts 39 adaptable to drives where a pulley or idler is driven by the top of the belt or where substantially vibrationless motion is required. Even though the inner periphery of each belt 39 may be deformed, it will either be flat or concave, the degree of concavity varying with the volumetric differential. Therefore, the flexibility of the belts 39 will always be maintained at a high level and will even be increased when their inner peripheries are concave. In addition, the concavity of the inner peripheries of belts 39 cannot possibly have any adverse effect upon their operational characteristics because the inner periphery of a belt does not contact the hub of the pulley in use.

Assuming that steam is used as the fluid for expanding sleeve 48, as the pressure reaches a preferred maximum of 90 to 100 lbs./sq. in., it will have a temperature ranging from 331° F. to 338° F., approximately. This will be sufficient to completely cure belts 35 and thus it is not absolutely necessary to place mold 26 in autoclave 10 at all. However, because of safety requirements and the desirability of speeding up the curing time for maximum production, it is preferable to employ an autoclave. Thus, shortly after valve 22 is operated to open inlet pipe 23, valve 18 is opened to admit steam into autoclave 10 under a pressure of 5 or 10 lbs./sq. in. with an approximate temperature range of 227° F. to 240° F. These conditions are maintained for approximately 10 minutes, at which point the pressure of the steam in autoclave 10 is raised to 40 or 50 lbs./sq. in. with a corresponding increase in temperature, ranging substantially from 286° F. to 298° F. After a period of approximately 10 more minutes the belts 39 are completely cured. As will be apparent, the steam in autoclave 10 heats up the outside of mold 26 and materially reduces the curing time.

At this time valve 18 is closed and valve 20 is opened to exhaust the steam from autoclave 10; at the same time valve 22 is operated to open outlet pipe 24, closing inlet pipe 23 in the process, of course, thereby permitting the fluid within mold 26 to exhaust therefrom also. The lid 13 is opened; mold 26 is disconnected from hose 57, removed from the autoclave 10, disassembled and the cured belts 39 are removed, whereupon another set of belts may be molded in like manner.

While the invention has been described and illustrated as applied to the molding of V-belts, belts of other cross-section may be made in the same manner. Likewise, variations other than those mentioned herein may be made by those skilled in the art without departing from the scope of the invention as defined in the appended claims.

Having thus described my invention, what I claim and desire to protect by Letters Patent is:

1. In an apparatus for molding endless belts having aligned, circumferential reinforcing cords embedded therein adjacent the outer peripheries thereof, a substantially cylindrical mold comprising a plurality of stacked mold rings forming the outer peripheral walls and side walls of annular cavities within and between said rings for receiving the outer peripheries and sides, respectively, of the individual belts, the entire inner peripheries of said belts being exposed, a flexible and radially expandable, substantially cylindrical sleeve positioned within said rings and adapted to close the entire inner peripheral openings extending between the side walls of said cavities and to contact the entire inner peripheries of said belts, means for closing the stacked rings at each end and for clamping said rings together, and means for admitting fluid under pressure within said sleeve to expand the same for applying outwardly directed, uniform radial pressure to the entire inner peripheries of said belts to force said belts completely into said cavities and to place uniform tension on said reinforcing cords.

2. In an apparatus for molding endless belts having aligned, circumferential reinforcing cords embedded therein adjacent the outer peripheries thereof, a substantially cylindrical mold as in claim 1, wherein said sleeve comprises a substantially cylindrical rubber sleeve.

3. In an apparatus for molding endless belts having aligned, circumferential reinforcing cords embedded therein adjacent the outer peripheries thereof, a substantially cylindrical mold as in claim 1, wherein the open ends of said sleeve are sealed solely by engagement with said closing means upon expansion of said sleeve.

4. In an apparatus for molding endless belts having aligned, circumferential reinforcing cords embedded therein adjacent the outer peripheries thereof, a substantially cylindrical mold as in claim 3, wherein said closing means comprises circular plates having walls forming opposed annular recesses for engaging and sealing said open ends of said sleeve upon expansion thereof.

5. In an apparatus for molding endless belts having aligned, circumferential reinforcing cords embedded therein adjacent the outer peripheries thereof, a substantially cylindrical mold as in claim 1, wherein said fluid admitting means comprises a hollow adapter supported by said closing and clamping means at one end.

6. In an apparatus for molding endless belts having alinged, circumferential reinforcing cords embedded therein adjacent the outer peripheries thereof, a substantially cylindrical mold comprising a plurality of stacked mold rings forming the outer peripheral walls and side walls of annular cavities within and between said rings for receiving the outer peripheries and sides, respectively, of the individual belts, the entire inner peripheries of said belts being exposed, a substantially cylindrical rubber sleeve positioned within said rings and adapted to close the entire inner peripheral openings extending between the side walls of said cavities and to contact the entire inner peripheries of said belts, a pair of circular plates closing the stacked rings at each end and having walls forming opposed annular recesses for engaging and sealing the open ends of said rubber sleeve upon expansion thereof, means engageable with said plates for clamping said rings together, and a hollow adapter supported by said clamping means and one of said plates for admitting fluid under pressure within said sleeve through an opening in said one plate to expand said sleeve for applying outwardly directed, uniform radial pressure to the entire inner peripheries of said belts to force said belts completely into said cavities, to effectively seal said belts therein and to place uniform tension on said reinforcing cords.

References Cited in the file of this patent

UNITED STATES PATENTS

| | | |
|---|---|---|
| 1,549,961 | Buckbee | Aug. 18, 1925 |
| 2,253,792 | Leavenworth | Aug. 26, 1941 |
| 2,569,303 | Garbin | Sept. 25, 1951 |
| 2,573,643 | Hurry | Oct. 30, 1951 |
| 2,599,046 | Brucker | June 3, 1952 |
| 2,602,188 | Gorecki | July 8, 1952 |
| 2,728,105 | Pacciarini | Dec. 27, 1955 |

FOREIGN PATENTS

| | | |
|---|---|---|
| 656,867 | Great Britain | Sept. 5, 1951 |